United States Patent [19]
Engelson

[11] 3,854,187
[45] Dec. 17, 1974

[54] APPARATUS FOR MAKING BEADED BELTS

[76] Inventor: David Engelson, 67-70 Yellowstone Blvd., Forest Hills, N.Y. 11375

[22] Filed: July 30, 1973

[21] Appl. No.: 384,139

[52] U.S. Cl. .............................................. 29/208 D
[51] Int. Cl. ........................................... B23p 19/04
[58] Field of Search .......... 29/208 D, 208 R, 208 C, 29/208 E, 211 R

[56] References Cited
UNITED STATES PATENTS
2,774,102  12/1956  Campbell .......................... 29/208 D Primary Examiner—Thomas H. Eager

[57] ABSTRACT

An apparatus for making beaded belts in which a first feed means helically advances a length of belt stock along a longitudinal path, and a second feed means feeds a string of beads along a path transverse to the advancing belt stock for winding thereupon to form a pattern of beads secured to the belt stock.

10 Claims, 5 Drawing Figures

3,854,187

PATENTED DEC 17 1974 3,854,187

APPARATUS FOR MAKING BEADED BELTS

BACKGROUND AND SUMMARY OF THE INVENTION

This invention relates in general to the making of belts, and more particularly to an apparatus for making ornamental beaded belts.

Heretofore in the manufacture of belts ornamented with beads, it was necessary to secure the beads to the belt stock by manually performed operations which involved much tedious labor and expense.

The invention provides an apparatus for making beaded belts whereby the beads are on a string, or wire, that is wound upon and around the belt stock by a combination of concurrently performed machine operations.

Basically, the apparatus of the invention comprises a first feed means operable to advance a length of belt stock helically along a given longitudinal path, and a second feed means operable to feed a string of pre-strung beads along a path transverse to the advancing belt stock for winding thereupon to form a pattern of beads secured to the belt stock.

In accordance with a preferred embodiment of the invention, the second feed means includes means operable to separate the beads on the string into groups of a predetermined number of beads, with each group of beads being spaced-apart on the string a predetermined distance from the next group. This spacing distance is set in relation to the winding circumference of the belt stock to position consecutive groups of beads in alignment with one another along a given side of the belt.

The first and second feed means are driven in a synchronous speed relation so that the rate at which the bead string is fed to the belt stock is co-ordinated with the longitudinal speed and helical pitch of the belt stock movement to wind the bead string upon the belt stock substantially without slack.

In cases where the beads are to be secured to the belt stock in an approximately contiguous pattern, the belt stock is advanced with a helical pitch corresponding to the diameter of the beads. However, in cases where the belt stock is provided with a helically extending groove, the drive means is set to advance the belt stock with the same pitch as that of its groove, so that the bead string will be wound in overlying alignment with the belt stock groove.

For a better understanding of the invention and its numerous advantages and applications, reference should be had to the following detailed description and accompanying drawings which exemplify a preferred embodiment of the invention.

DESCRIPTION OF A PREFERRED EMBODIMENT OF THE INVENTION

Figure 1:
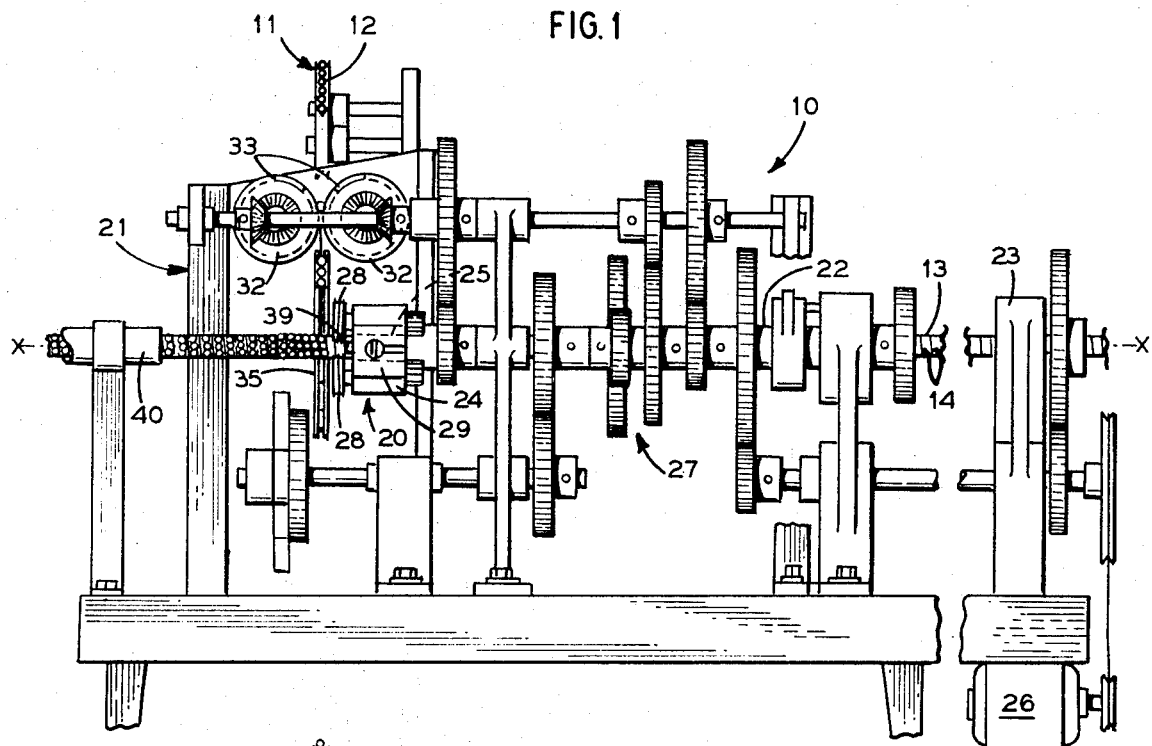
FIG. 1 is a schematic front elevation view of a belt making apparatus according to a preferred embodiment of the invention.
Figure 2:
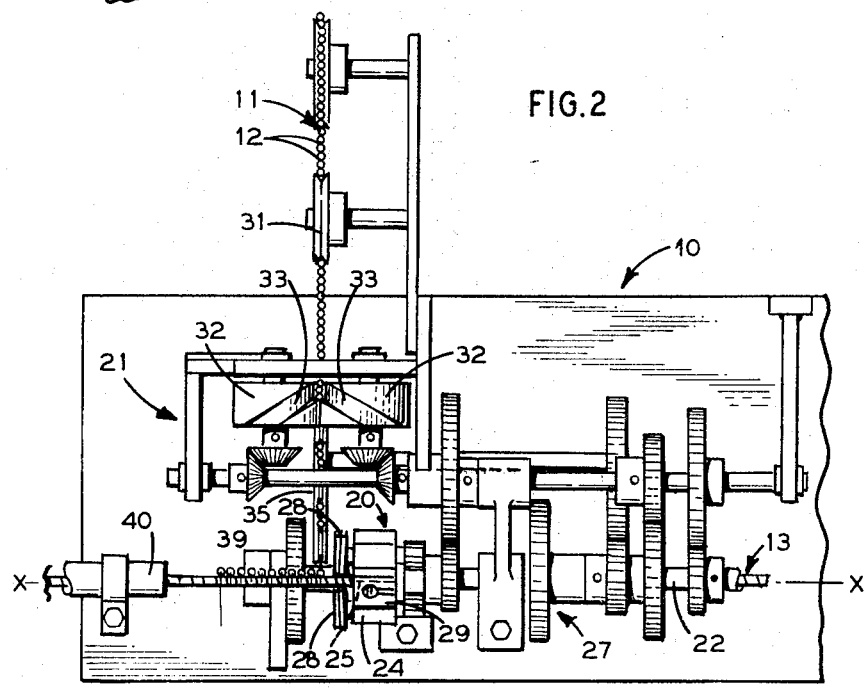
FIG. 2 is a schematic plan view of the left end portion of the belt making apparatus shown in FIG. 1.
Figure 3:
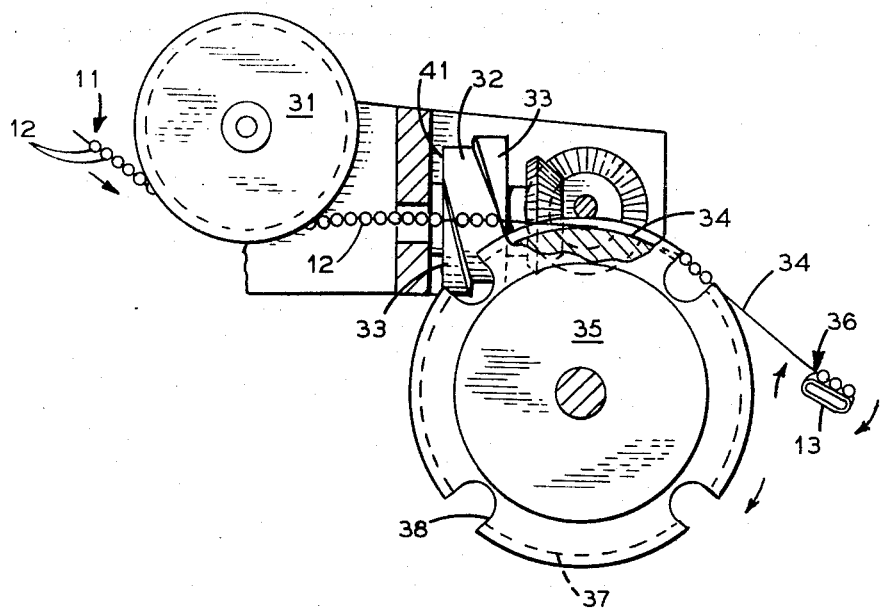
FIG. 3 is a schematic detail view of the bead string feed mechanism need in the belt making apparatus of FIG. 1.
Figure 5:
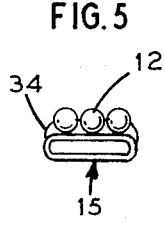
FIG. 5 is an end view of the beaded belt length shown in FIG. 4.
Figure 4:
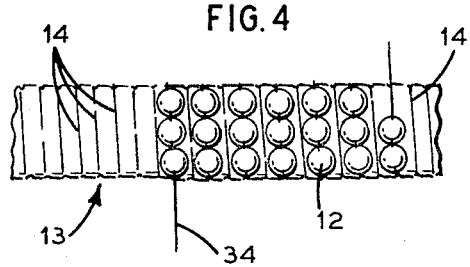
FIG. 4 is a side view of a typical length of beaded belt produced by the belt making apparatus of FIG. 1 when equipped with the three-bead group type of bead string feed mechanism shown in FIG. 3.

FIGS. 1 – 3 exemplify schematically a beaded belt making apparatus 10 which is operable to make from a string 11 of pre-strung beads 12, and an extended length of belt stock 13, an ornamentally beaded belt product, shown in FIGS. 4 and 5, in which rows of three beads 12 each are secured in a pattern along one side of the belt stock 13. The belt stock 13 is expediently fabricated by winding a metal strip to form a flattened, flexible conduit as shown, in which adjacent turns are lockingly overlapped by formed surfaces that define a helically extending groove 14 in belt stock 13. To make the belt product shown, the beads 12 necessarily are separated into groups of three beads 12 each, the number required to cover the width of belt stock 13, and consecutive groups of beads 12 are spaced apart on string 11, which is preferably a wire, by a distance corresponding to the winding circumference of belt stock 13, less the portion of that circumference covered by the three beads 12 of the transverse row. The pitch of the bead string wound upon belt stock 13 is substantially the same as that of groove 14, so that the portions of base string 11 between bead groups will be captured in groove 14, and will be flush with the back side 15 of belt stock 13, and the bead string will be in overlying alignment with groove 14. Here it should be noted that the pitch of groove 14 corresponds to the diameter of the beads 12, since the beads 12 of successive rows are closely spaced. If it should be desired to use larger beads, or have a different spacing between rows of beads, a belt stock 13 with a different groove 14 pitch would be used, or else the spacing on the string 11 between groups of beads 12 would be increased to allow winding of two or more turns of bare string 11 around belt stock 13 to give the desired spacing between rows of beads 12.

As will be appreciated by the artisan, the invention is not restricted in its application to use with the particular type of belt stock 13 shown.

Apparatus 10 can be regarded basically as having a first feed means 20 that is operable to advance a length of belt stock 13 helically along a given longitudinal path identified by line X—X, and a second feed means 21 operable to feed a string 11 of pre-strung beads 12 to belt stock 13 for winding thereupon as the belt stock 13 helically advances.

For handling the belt stock 13, there is provided in apparatus 10 a hollow shaft 22, which can be made up of one or more interconnected sections, and a rotatable mandrel holder 23. Belt stock 13 is expediently slipped over a flat bar mandrel (not shown) held at one end and turned by holder 23, and extended through shaft 22 and the feed-through passage 25 of a chuck 24. Belt stock 13, is thus supported so that it can be helically advanced through shaft 22 along line X—X.

Chuck 24 is supported to be rotatably driven about axis X—X by a motor 26 through a transmission 27 including a multiplicity of meshing gears. The feed-through passage 25, and guides on chuck 24 are disposed so that belt stock 13 is constrained to turn with chuck 24. On the front of chuck 24 are mounted a pair of rotatably driven worm wheels 28 having threads disposed for engagement with the helically extending groove 14 in the belt stock 13. These worm wheels 28 are thus driven in orbital movement in unison about axis X—X and impart an axial movement to belt stock 13 that combines with the rotary movement imparted by chuck 24 to advance belt stock 13 helically along path X—X.

Thus, the belt stock feed means 20 is basically the combination of chuck 24 and worm wheels 28. To allow for easy servicing and setting worm wheels 28 precisely in registry with the belt stock 13, chuck 24 is expediently a split-type chuck that is held together with a slidable member 29.

Bead string feed means 21 is adapted to receive from a supply thereof, (not shown) a continuous string 11 of beads 12 that are pre-strung so as to lie bunched together as the string 11 passes under an idler guide pulley 31, as seen in FIG. 3. Feed means 21 includes a pair of counterrotatably driven cams 32 having respective spaced-apart projecting fingers 33 that cooperate to engage beads 12 on the string 11 and move groups of a predetermined number of beads 12, (in this case three beads 12 per group), relative to the string 11 so as to separate the beads 12 into groups spaced-apart on the string 11 by bare string length sections 34. As previously explained the length of string sections 34 is related to the winding circumference of the belt stock to position consecutive groups of beads as transverse rows on belt stock 13, aligned with one another along the given side thereof.

A rotatably driven carrier wheel 35 guides the movement of the grouped bead string from the pair of cams 32 to a location 36 on the belt stock 13 where the incoming string of beads is received. Carrier wheel 35 has grooved portions 37 of circumferential length fitting the string portions 34, and which laterally constrain the string itself, and circumferentially spaced pockets 38 that constrain the groups of beads from movement along the string to maintain the intended spacing between groups of beads.

On chuck 24 is provided means, such as a guide finger 39 operable to elastically deform the belt stock at the location 36 thereon where the incoming bead string is received, to capture in the groove 14 of the belt stock 13 the portions 34 of the string as it is wound upon belt stock 13 in overlying alignment with groove 14. Such elastic deformation is only temporary, and the beaded belt product passes generally along line X—X through a guide tube 40 for support thereby until the length of belt stock 13 is completely beaded.

While the design of the drive means for the chuck 24 and worm wheels 28 of belt stock feed means 20, and for the cams 32 and carrier wheel 35 of bead string feed means 21 can be varied and will become apparent to the artisan, it should be noted that the feed means 20 and 21 are driven in a synchronous speed relation so that the groups of beads 12 are located in proper spacing relation to produce the product shown in FIGS. 4 and 5 and assure that the winding operation will proceed substantially without slack.

It should be noted that the cams 32 essentially pick off each bead group and advance it to a pocket 38 of carrier wheel 35. Depending upon the spacing imparted between the bead group carried between fingers 33 and the first bead 12 of the next group, which is held back by the end faces 41 of cams 32, the carrier wheel 35 will either maintain the spacing established by cams 32, if such spacing is equal to the length of the grooved portions 37, or else the carrier wheel 35 will advance the picked up bead group by an amount sufficient to fit the length of the grooved portions 37. Thus, the spacing between fingers 33 on cams 32 corresponds to the number of beads per group, as does the size of the pockets 38 on carrier wheel 35, and the arc length of grooved portions 37 corresponds to the spacing between groups of beads 12. One group of beads 12 is picked up by cams 32 for every revolution thereof.

From the foregoing, it will be appreciated by the artisan that the invention is adaptable to numerous modifications and detail variations that will become obvious from the requirements for a particular application.

What is claimed is:

1. An apparatus for making beaded belts which comprises a first feed means operable to advance a length of belt stock helically along a given longitudinal path, and a second feed means operable to feed a string of beads to said belt stock for winding thereupon as said belt stock helically advances.

2. An apparatus according to claim 1 wherein said second feed means includes means operable to separate the beads on said string into groups of a predetermined number of beads, with each group of beads spaced-apart on the string a predetermined distance from the next group, said distance being related to the winding circumference of the belt stock to position consecutive groups of beads in alignment with one another along a given side of the belt stock.

3. An apparatus according to claim 1 including drive means connected to said first feed means and connected to said second feed means to drive said first and second feed means in a synchronous speed relation to advance the belt stock at a given longitudinal speed and with a given helical pitch, and to feed said string of beads to the belt stock at a rate corresponding to the longitudinal speed and helical pitch thereof to wind the string of beads upon the belt stock substantially without slack.

4. An apparatus according to claim 1 wherein said first feed means includes a pair of rotatably driven worm wheels having threads disposed for engagement with helically extending groove means in the belt stock, said worm wheels being driven in orbital movement in unison about an axis defining said longitudinal path to helically advance the belt stock therealong.

5. An apparatus according to claim 1 wherein said second feed means includes a pair of rotatably driven cams cooperating to engage beads on said string and move groups of beads relative to said string to separate the beads into groups of a predetermined number of beads each and spaced apart on the string for winding upon the belt stock to form a given pattern of beads secured thereto.

6. An apparatus according to claim 3 wherein said drive means is operable to advance the belt stock with a helical pitch corresponding to the diameter of said beads.

7. An apparatus according to claim 3 wherein said drive means is operable to advance the belt stock with a helical pitch corresponding to the pitch of a helically extending groove in the belt stock.

8. An apparatus according to claim 4 wherein said second feed means is disposed to feed the string of beads to the belt stock for winding thereupon in overlying alignment with said helically extending groove in the belt stock.

9. An apparatus according to claim 5 wherein said second feed means is disposed to feed the string of beads to the belt stock for winding thereupon in overlying alignment with a helically extending groove in the belt stock, and including means operable to elastically deform the belt stock at the location thereon where the incoming string of beads is received to capture in said groove of the belt stock those portions of the string between groups of beads.

10. An apparatus according to claim 5 wherein said second feed means includes a rotatably driven carrier wheel that guides the movement of said string of beads from said pair of cams to a location on the belt stock where the incoming string of beads is received, said carrier wheel having grooved portions that laterally constrain the string itself, and circumferentially spaced pockets that constrain the groups of beads for movement with the string in a predetermined spacing arrangement.

* * * * *